June 6, 1961
C. R. BREDEN ET AL
2,987,458
TWISTED RIBBON FUEL ELEMENT
Filed Dec. 14, 1954
4 Sheets-Sheet 1
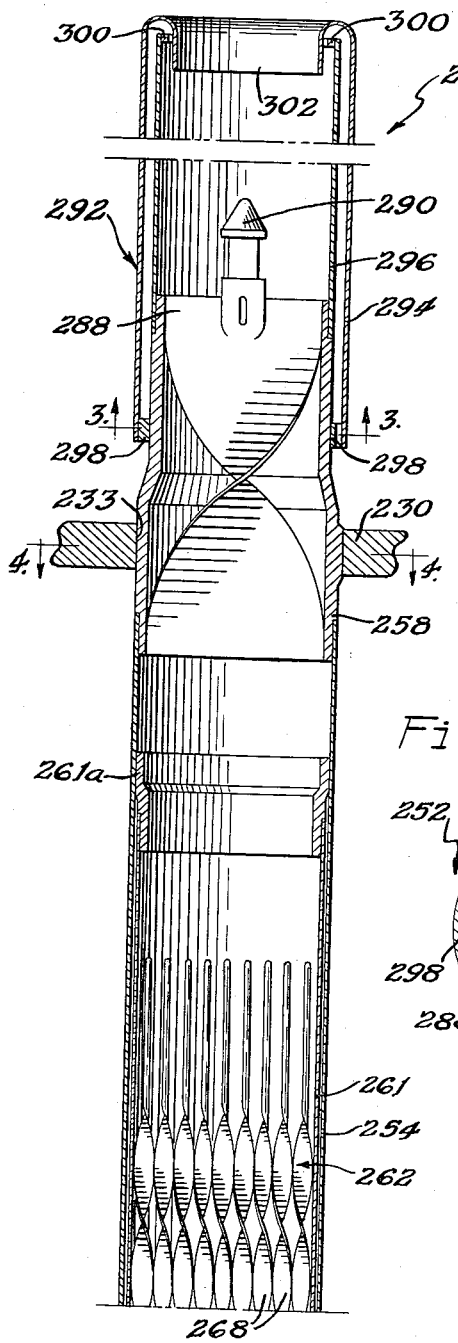
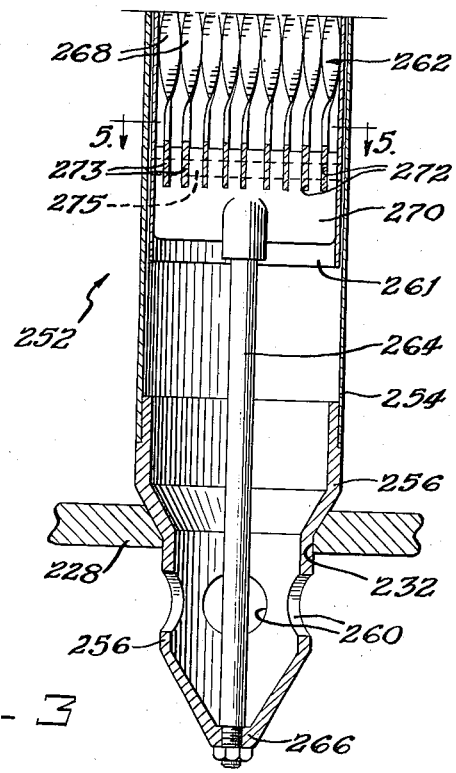
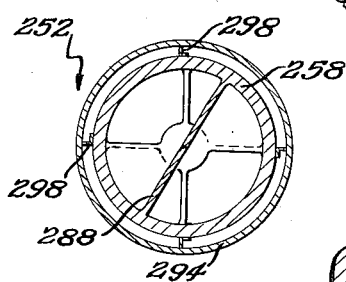
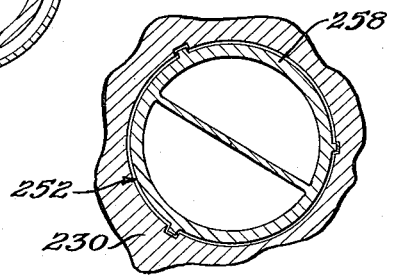
INVENTORS
Calvin R. Breden
Arthur B. Schultz
BY
ATTORNEY June 6, 1961
C. R. BREDEN ET AL
2,987,458
TWISTED RIBBON FUEL ELEMENT
Filed Dec. 14, 1954
4 Sheets—Sheet 2
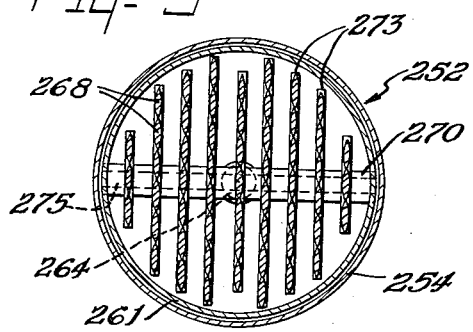
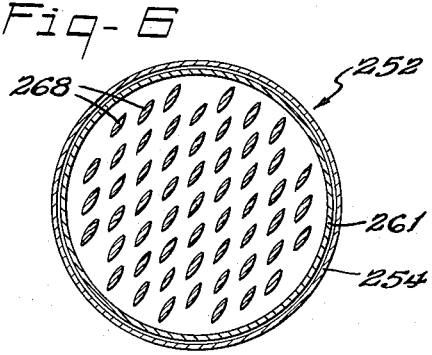
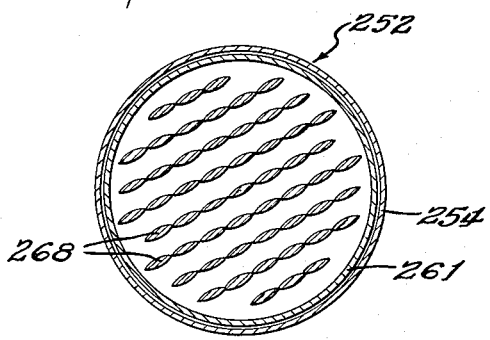
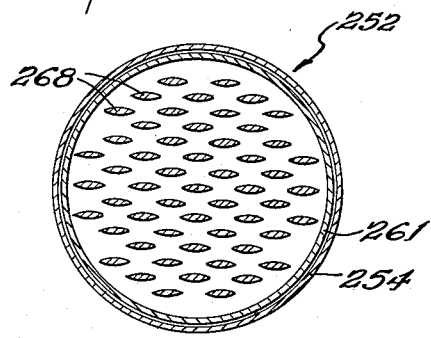
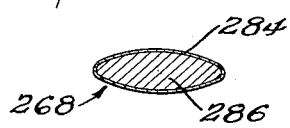
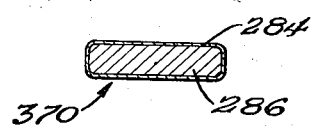
INVENTORS
Calvin R. Breden
Arthur B. Schultz
BY
ATTORNEY June 6, 1961 C. R. BREDEN ET AL 2,987,458
TWISTED RIBBON FUEL ELEMENT
Filed Dec. 14, 1954 4 Sheets-Sheet 3

INVENTORS
Calvin R. Breden
Arthur B. Schultz
BY
Roland A. Anderson
ATTORNEY

June 6, 1961

C. R. BREDEN ET AL 2,987,458

TWISTED RIBBON FUEL ELEMENT

Filed Dec. 14, 1954

INVENTORS
Calvin R. Breden
Arthur B. Schultz
BY

ATTORNEY

United States Patent Office 2,987,458
Patented June 6, 1961

2,987,458
TWISTED RIBBON FUEL ELEMENT
Calvin R. Breden, La Grange, and Arthur B. Schultz, Western Springs, Ill., assignors to the United States of America as represented by the United States Atomic Energy Commission
Filed Dec. 14, 1954, Ser. No. 475,319
4 Claims. (Cl. 204—193.2)

This invention relates to an assembly of elements that are used for purposes of heat transfer. More specifically, it relates to a group or bundle of nuclear-fuel elements that are shaped in a special way and are supported on one another, so that sufficient passageways for cooling fluid are provided between them.

In certain nuclear reactors it has been found desirable to arrange elongated nuclear-fuel elements in side-by-side, generally parallel, closely spaced relationship so that cooling fluid may be flowed lengthwise of the fuel elements in the spaces between for removing the heat generated thereby. It is, of course, theoretically possible to design supports that will hold the elements apart and provide channels for the cooling fluid. Such a design can be tremendously costly and difficult to construct and maintain.

We have eliminated the need for such special supports by giving the fuel elements a special shape that enables them to be supported directly against one another while providing passageways between for the flow of cooling fluids.

According to the present invention, the nuclear-fuel elements are twisted about their axes and assembled so as to have contact with one another at regions spaced lengthwise of the fuel elements. The contact or engagement between the fuel elements is sufficient to allow them to be held together in stable groups or bundles without intermediate support, while permitting the requisite spacing for flow of coolant between the fuel elements.

In the drawings:

FIG. 1 is a vertical sectional view of the upper portion of an assembly of fuel elements of the present invention;

FIG. 2 is a vertical sectional view of the lower portion of said assembly of fuel elements;

FIG. 3 is a horizontal sectional view taken on the line 3—3 of FIG. 1;

FIG. 4 is a horizontal sectional view taken on the line 4—4 of FIG. 1;

FIG. 5 is a horizontal sectional view taken on the the line 5—5 of FIG. 2, illustrating the arrangement of the fuel elements of the assembly of the present invention at their bases and the mode of attachment of the fuel-element bases to a common support;

FIGS. 6, 7 and 8 are horizontal sectional views taken through the assembly of the present invention at successive levels above that of FIG. 5 and illustrating the relationship of the fuel elements to one another;

FIG. 9 is a transverse sectional view of a single fuel element;

FIG. 10 is a transverse sectional view of a single fuel element of modified cross-sectional shape;

First of all, the reactor in which the fuel-element assembly of the present invention is shown will be described.

Figure 11:
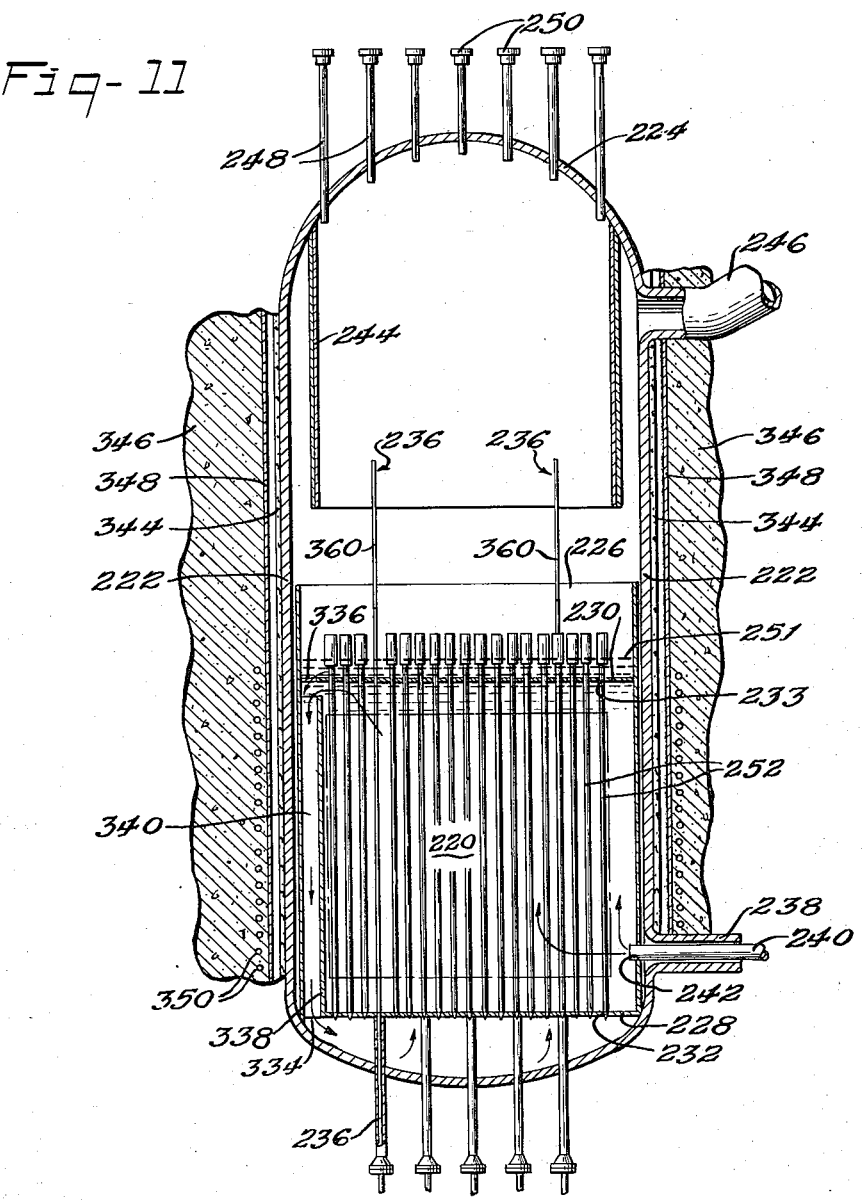
FIG. 11 is a vertical sectional view of a neutronic reactor in which the novel fuel-element assembly of the present invention is employed.
Figure 12:
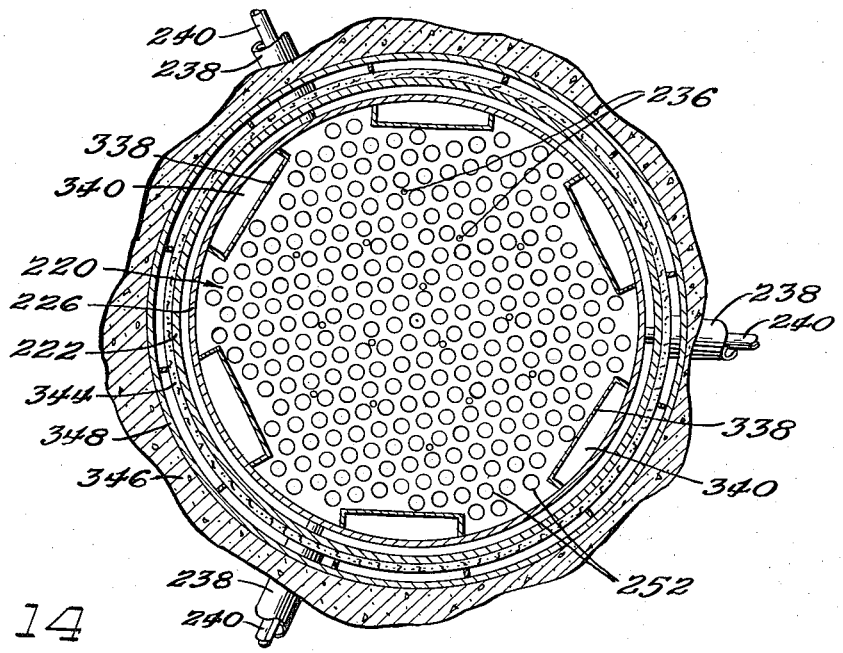
FIG. 12 is a horizontal sectional view of the neutronic reactor.

As illustrated in FIGS. 11 and 12, a reactor core 220 is disposed within a pressure vessel 222 which is elongated and cylindrical in cross section. The core 220 is disposed in the lower end of the pressure vessel 222, and a steam dome 224 is disposed at the upper end of the pressure vessel 222. The volume of the steam dome 224 approximately equals the volume in which the reactor core is disposed. A cylindrical thermal shield 226 is disposed about the core 220 of the reactor adjacent to the walls of the pressure vessel 222. The thermal shield 226 is constructed of stainless steel and is adapted to prevent the passage of thermal neutrons to the exterior of the pressure vessel 222. A pair of grids 228 and 230 disposed at the bottom and top of the core 220, respectively, are secured to the thermal shield 226 normal to the axis of the pressure vessel 222. The grids 228 and 230 are provided with a plurality of apertures 232 and 233, respectively, disposed within a hexagonal array, an aperture 232 in grid 228 being aligned with an aperture 233 in the grid 230, so that a fuel-element assembly for the active portion of the reactor may be supported within each pair of aligned apertures 232 and 233. The grids 228 and 230 are also provided with sets of aligned apertures through which translatable control elements 236 extend in order to be positioned within the active portion 220 of the reactor, as will be described hereinafter. The pressure vessel 222 is provided in its side walls with three outlets 238 spaced 120° from one another adjacent to the lower portion of the active portion 220 of the reactor, and a pipe 240 extends through each outlet 238 and is sealed therein. Each pipe 240 is also sealed within an aperture 242 in the thermal shield 226, and the pipes 240 are used to supply coolant water to the pressure vessel 222.

A cylindrical baffle 244 is axially disposed within the the pressure vessel 222 and sealed to the dome 224 thereof. A steam outlet 246 is disposed in the pressure vessel 222 adjacent to the dome 224 thereof and in front of the separator baffle 244. In this manner, steam rising from the active portion 220 of the reactor into the dome 224 of the pressure vessel 222 must exit by passing around the separator baffle 244, and a considerable amount of the water remaining in the steam will separate out upon the baffle 244. A plurality of unloading tubes 248 pierce the dome of the pressure vessel 222, and leak-tight caps 250 seal the extremities of the unloading tubes 248. The lower portion of the pressure vessel 222 is filled with heavy water which extends above the active portion 220 of the reactor to a level 251, as illustrated in Fig. 11.

Fuel-element assemblies 252, used within the active portion 220 of the reactor, are illustrated in FIGS. 1 through 4. Each of these assemblies 252 is provided with a cylindrical sleeve 254 of zirconium which extends between a lower grid fitting 256 and an upper grid fitting 258, both of stainless steel. The upper portion of each aperture 232 in the lower grid 228 is outwardly flaring and the lower grid fitting 256 is provided with a contour complementary thereto, so that the lower grid fitting 256 forms a relatively tight seal when disposed within the aperture 232. The lower grid fitting 256 extends beneath the lower grid 228 and is provided with a plurality of orifices 260 which permit the D₂O in the pressure vessel 222 to enter into the lower grid fitting 256 and the sleeve 254 of the assembly 252. An inner sleeve 261 of zirconium is mounted in the sleeve 254 by means of a fitting 261a of zirconium, which is secured in an upper region of the sleeve 261 and closes the upper end of a space between the sleeves 254 and 261. The lower end of this space is open, and D₂O enters the space at this region, serving as a heat insulator between the relatively cool D₂O on the outside of the sleeve 254 and the relatively hot D₂O in the sleeve 261.

A fuel region 262 in each fuel-element assembly 252 is disposed adjacent to the lower grid fitting 256 and is supported thereon by a shaft 264 which extends along the axis of the sleeve 254 and terminates at the extremity 266 of the lower grid fitting 256. The thermal-neutron-fissionable material is disposed in the form of ribbons or elements 268 which are twisted throughout their length and are supported upon a support bar 270 which is attached to the shaft 264. The support bar 270 is provided with slots 272, and strips 273 of various lengths are secured in the slots 272 by a pin 275 in each fuel element 252. The twisted ribbons 268 are arranged in rows with one end of each ribbon in a given row being secured to a single trip 273, as shown in FIGS. 2 and 5. The flow of coolant water travels upwardly through the sleeve 254 of the fuel element 252 between the strips 273 in each fuel element 252.

Attention is now directed to FIGS. 5 to 8 in which the relationship of the fuel elements in a given assembly is illustrated. As previously stated, the lower ends of the elements or ribbons 268 are attached to strips 273. These strips are spaced and parallel and are of different lengths. As shown in FIG. 5, the lower ends of the ribbons 268 are arranged in spaced parallel rows of different lengths, the ribbons in each row having edge contact.

As we go up the assembly 252 to the level shown in FIG. 6, the ribbons 268 are twisted 30 degrees clockwise from the position of FIG. 5, and there is no contact between them.

Farther up the assembly 252 at the level shown in FIG. 7, the ribbons 268 have twisted 60 degrees clockwise from the position of FIG. 5. At this level they have edge contact in new spaced parallel rows of varying lengths, which are displaced 60 degrees from the rows of FIG. 5. Thus at the level of FIG. 7 the ribbons 268 are supported against one another by virtue of the edge contact between them.

Still farther up the assembly 252 at the level shown in FIG. 8, the ribbons 268 are twisted 90 degrees clockwise from the position of FIG. 5 and there is no contact between them.

As we go farther up the assembly 252 the twist continues so that at 120, 180, 240 and 300 degrees of twist there is edge contact between the ribbons 268 in rows that are rotated 120, 180, 240 and 300 degrees, respectively, from the rows of FIG. 5, and at 150, 210, 270 and 330 degrees of twist the ribbons 268 have no contact with one another.

Edge contact between the ribbons 268 occurs at every 60 degrees of twist, because at every level where contact occurs the ribbons of each are staggered with respect to the ribbons of the adjacent rows by an amount equal to one-half the longer cross-sectional dimension of each ribbon. Since the rows of contacting ribbons are located at various regions spaced lengthwise thereof and extend in the various 60 degree directions between 0 and 360 degrees, depending on how twisted the ribbons are for their lengths, there is good support of one ribbon on another in various directions and at regions all along the lengths of the ribbons. Thus there is no need for support between the ribbons, and yet the ribbons are sufficiently spaced from one another so as to permit adequate flow of coolant along and between the ribbons.

Figure 13:
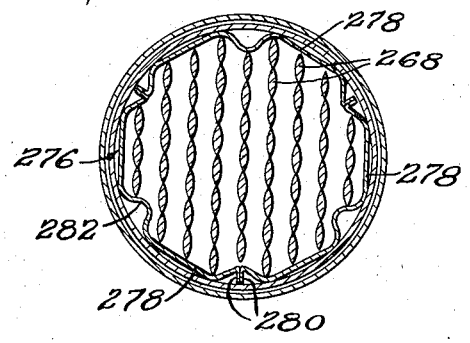
FIG. 13 is a horizontal sectional view taken through a modified fuel-element assembly of the present invention, illustrating the use of a special ring to hold the fuel elements together.

If desired, the ribbons 268 may be held together, as shown in FIG. 13, by one or more rings 276 of stainless steel. The ring or rings may be applied to the ribbons at one or more regions spaced lengthwise of the ribbons. For example, a ring 276 may be applied at the level of the assembly 252 where the ribbons are twisted 180 degrees from the position of FIG. 5, as shown in FIG. 13. For convenience of application to the ribbons, the ring is formed in three sections or segments 278, which are welded or soldered to one another at outwardly directed end flanges 280 after being assembled about the ribbons. The portions of the ring segments 278 directly adjacent the end flanges 280 are shaped to three regions in the periphery of the bundle of ribbons 268. Three other reentrant regions of this kind receive offset or depressed portions 282 formed in the central regions of the ring segments 278.

The rings 276 may also be applied at other levels where the twisted ribbons arrange themselves in rows of ribbons with edge contact, as shown in FIG. 7, or at levels between such other levels. Each of the ribbons 268 is approximately oval in shape, as illustrated in FIG. 9, and is provided with a fluid-tight jacket 284 about the surfaces thereof. Each ribbon 268 has a major axis of approximately 0.570 inch and a minor axis of approximately 0.175 inch. The jacket 284 has a thickness measured along the major axis of the ribbon 268 of 0.030 inch, and a thickness of approximately 0.015 inch measured along the minor axis. There are nine rows of ribbons 268 within each fuel section 262, the ribbons 268 being arranged in rows of 3, 6, 7, 8, 7, 8, 7, 6 and 3 ribbons in each row. The rows of ribbons 268 are equally spaced and centered within the sleeve 254 of the fuel element 252. Each of the 55 twisted ribbons 268 contain a core 286 of uranium with isotopic content of uranium as found in nature alloyed with niobium and zirconium, and the jackets 284 are constructed of zirconium. The elements may be fabricated by extrustion of a zirconium-clad uranium cylinder followed by roll-flattening and twisting.

The upper grid fitting 258 is snugly fitted within an aperture 233 in the upper grid 230. It is provided with a spiral deflector 288 for making the flow of water and steam more uniform from the upper end of the fuel-element assembly 252. The assembly 252 is provided with a lifting knob 290 secured to the deflector 288. A steam separator 292 is attached to the upper grid fitting 258 and extends above the level 251 of the moderator in the pressure vessel 222. As illustrated in FIG. 1, the steam separator 292 has an outer sleeve 294 concentrically disposed and spaced from an inner sleeve 296 which is attached to the upper grid fitting 258 and extends above the moderator level. A plurality of spacer elements 298 secures the upper grid fitting 258 to the lower end of outer sleeve 294 so as to support the outer sleeve on the grid fitting, while permitting water between the sleeves 294 and 296 to return to the pressure vessel 222. Similarly, a plurality of spacer elements 300 secures the upper end of the inner sleeve to an inwardly and downwardly directed lip 302 formed on the upper end of the outer sleeve 294.

The steam exiting from the fuel-element assembly 252 tends to pass through the steam separator 292 along the axis of the assembly 252, while water tends to be swirled to the inner wall 296 of the separator 292. As a result, water will pass between the lip 302 and the upper end of inner sleeve 296 and downwardly between the inner sleeve 296 and the outer sleeve 294, and back into the pressure vessel 222.

The following table sets forth the design dimensions of the reactor.

TABLE I

*Reactor dimensions*

Reactor Geometry:
| | |
|---|---|
| Pressure vessel diameter _____ft__ | 16 |
| Pressure vessel height _____ft__ | 43 |
| Active portion diameter (measured across center of active portion from outer surfaces of outermost fuel elements)__ft__ | 13½ |
| Active portion height (measured from ends of fuel ribbons 268) _____ft__ | 12 |
| Radial D$_2$O reflector _____ft__ | 1¼ |
| Vertical D$_2$O reflector above and below active portion _____ft__ | 1½ |
| Number of fuel elements assemblies 252_ | 295 |
| Total cooling surface _____sq. ft__ | 21,000 |

Lattice arrangement: 6 in. diameter fuel tubes 252 placed in 9 in. between centers parallel triangular lattice.

| | |
|---|---|
| Fuel element sleeves 254, outside diameter _____in__ | 6 |
| Wall thickness _____in__ | 1/16 |
| Material _____ | Zirconium |
| Fuel alloy 268 thickness _____in__ | 0.120 |
| Jacket 290 thickness _____in__ | 0.015 |
| Fuel element total thickness _____in__ | 0.150 |

Composition of fuel alloy, percent by weight:
| | |
|---|---|
| U _____ | 93.5 |
| Nb _____ | 1.5 |
| Zr _____ | 5 |

D$_2$O/U weight ratio in reactor:
| | |
|---|---|
| Cold _____ | 2.5 |
| Operating _____ | 2.0 |

Fuel and D$_2$O requirements:
| | |
|---|---|
| Fuel, amount of uranium _____tons__ | 39 |
| Total fuel alloy _____do____ | 41.7 |
| Uranium per fuel assembly _____lbs__ | 265 |

Each fuel element 254 contains 55 fuel ribbons, 0.59 in. x 0.15 in. including 0.015 in. Zr. clad, as previously described.

| | |
|---|---|
| D$_2$O in reactor tank (cold) _____tons__ | 100 |
| D$_2$O outside reactor _____do____ | 20 |

The grids 228 and 230 are provided with a plurality of aligned recesses 334 and 336 (FIG. 11) respectively, and channels 338 are sealed to the thermal shield 226 in alignment with recesses 334 and 336 to form passages 340. Each of the channels 338 is sealed at its lower end to the lower grid 228 and terminates at its upper end in slightly spaced relation to the top grid 230 to facilitate circulation of water, as will be hereinafter described.

As illustrated and described in Table I, the reactor core 220 consists of 295 bundles of fuel heterogeneously arranged in the D$_2$O moderator and coolant. The bundles are arranged with a 9 inch triangular lattice. The reactor operates with a steam pressure of 600 pounds per square inch area with a steam saturation temperature of 486° F.

The heavy water moderator is maintained at an average temperature of 145° F. by introducing 90° F. heavy water into the pressure vessel 222 adjacent to the bottom thereof. By maintaining the moderator water at a relatively low temperature, increased moderation is obtained, and less reactivity change must be accommodated in going from hot to cold operation. Gamma ray and neutron heating in the moderator combines with heat transfer from the fuel tubes to increase the heavy water temperature to 190° F. at the top of the core. The heavy water is then introduced into the passages 340 which carry it downward to the inlet end of the fuel-element assemblies 252 as a result of the pressure differential caused by the rising of the heavy water in the assemblies 252, so that circulating water is subcooled as it enters the assemblies 252 with a temperature of aproximately 450° F. As the heavy water flows upward through the fuel-element assemblies 252, boiling starts after about 25% of the travel. It continues to boil through the remainder of the assemblies 252 and leaves the core approximately ⅐ by weight steam and 6/7 water. This mixture passes through the primary moisture separators at sufficient speed to swirl the water to the inner sleeve 296 and concentrate the steam at the center of the sleeve 296. The water flows upward between the lip 302 and the upper end of the sleeve 296 and then downward between the sleeves and exits from the lower end of the outer sleeve 294 into the pressure vessel. The dry steam proceeds through the lip 302 at the top of the fuel-element assembly 252 and passes into the steam dome 224. The steam then passes around the baffle 244 to the inside surface of the pressure vessel 222 and exits through the outlet 246.

As stated previously, the assemblies 252 are disposed within the active portion 220 parallel to each other and spaced 9 inches apart in a triangular lattice. All told, there are 295 assemblies 252 in the active portion 220 of the reactor, and these assemblies 252 must be removed through the dome 224 of the pressure vessel 222. The pressure vessel 222 would be materially weakened if 295 orifices were provided in the dome 224, so one unloading tube 248 pierces the dome 224 of the pressure vessel 222 for each seven assemblies 252. As a result of reducing the spacing between the unloading tubes 248, the pressure vessel 222 will carry an internal pressure approximately 2¼ times greater with the same degree of safety.

The thermal shield 226, which is disposed within the pressure vessel 222, reduces the neutron and gamma flux and the resultant thermal stresses in the pressure vessel 222. Grids 228 and 230 also serve as thermal shields and protect the pressure vessel 222 from radiation-induced thermal stresses.

A layer of thermal insulating material 344 approximately six inches thick is disposed about the pressure vessel 222, as illustrated in FIGS. 11 and 12, to protect an eight-foot thick concrete biological shield 346 surrounding the reactor from conducted heat and to conserve thermal energy. A steel form 348 for the concrete shield 346 lies within it and surrounds the layer 344 of insulating material. The concrete shield 346 is provided with cooling coils 350 adjacent to its inner periphery to dissipate heat liberated by gamma radiation. A thermal shield (not shown) consisting of steel plates is disposed above the reactor. A steam separator (not shown) is disposed exterior to the shield 346 and connected to the outlet 246 in the pressure vessel 222. The steam separator further dries the steam produced by the reactor, and the steam is conducted to a steam turbine, not shown, which drives an electric generator, not shown, whereby the energy of the steam is converted to rotational motion and subsequently to electricity in a conventional manner. The steam exhausted from the turbine is then circulated through a condenser which transforms the exhausted steam into heavy water once again. The liquefied heavy water is pumped from the condenser back to the reactor through the pipe 240 and repeats the cycle. In this manner, very little heavy water is lost in the operation of the reactor.

One of the features of the boiling heavy water reactor described above is that it possesses a high degree of safety during operation. This is due to the fact that the formation of steam within the reactor reduces the reactivity of the reactor, and hence there is very little danger of the power of the reactor exceeding permissible operating conditions.

The fifteen control elements 236 are used primarily to determine the power level of the reactor and to provide a safety control in the event unsafe operating conditions develop. The control elements 236 have cadmium sections 360 which are disposed upwardly from the active portion 220 of the reactor in normal operation, the lowering of the control elements 236 introducing the cadmium sections into the active portion 220 of the reactor and diminishing the reactivity thereof. Each of the cadmium portions 360 is in the form of a hollow sleeve approximately ⅜ inch thick, 1½ inches in diameter and 3 feet in length. Any conventional means may be utilized to position the control elements 236 within the reactor and are attached to the end of the control elements 236 extending from the reactor beneath the active portion 220 thereof. The control elements 236 are each disposed approximately at the center of a group of three triangularly disposed fuel-element assemblies 252, and the control elements 236 are disposed at a distance of approximately 27½ inches from each other throughout the lattice structure, as illustrated in FIG. 12.

The following two tables will summarize the performance of the reactor and associated turbo-generator, and the physics data pertaining to the operation of the reactor itself. In these tables, the terminology and symbols are those used in Glasstone and Edlund "The Elements of Nuclear Reactor Theory," D. Van Nostrand Co., Inc., 1952.

TABLE II
*Plant performance data*

| | |
|---|---|
| Reactor power transferred from cooling surface mw | 1,000 |
| Total reactor power mw | 1,060 |
| Maximum fuel element surface temperature in reactor °F | 545 |
| Maximum flux for heat transfer (neutron flux flattened across reactor) B.t.u./(hr.) (sq. ft.) | 300,000 |
| Maximum flux for heat transfer (neutron flux unflattened across reactor) B.t.u./(hr.) (sq. ft.) | 400,000 |
| Steam temperature °F | 486 |
| Maximum pressure drop in channels p.s.i | 20 |
| Steam production lb./hr. | $3.8 \times 10^6$ |
| Steam pressure p.s.i.a | 600 |
| Condenser pressure in. Hg | 1½ |
| Steam cycle efficiency percent | 28 |
| Uranium fuel used per operating day tons | 0.106 |
| Uranium fuel used per operating year do | 31 |
| Number of fuel assemblies used per year do | 235 |

TABLE III
*Reactor physics data*

| | |
|---|---|
| Operating Constants (boiling at 486° F.): | |
| $f$ (including Xe+Sm) | 0.932 |
| $p$ (U+Nb) | 0.864 |
| $p$ (U alone) | 0.869 |
| $\epsilon$ | 1.028 |
| $\eta$ | 1.33 |
| $k_{\infty}$ (with Xe) | 1.101 |
| $\tau$ | 202 |
| $L^2$ | 98 |
| $M^2$ | 300 |
| $B_m^2$ | $3.3 \times 10^{-4}$ |
| $k_{eff}$ for unflattened pile (with Xe) | 1.059 |
| Average flux for operating reactor | $8.6 \times 10^{13}$ |
| Flux max/avg. ratio for unflattened reactor: | |
| Radial | 1.78 |
| Axial | 1.27 |
| Inside fuel-element assemblies 252 | 1.15 |
| Over reactor | 2.6 |
| Flux, max./avg. over flattened reactor | 1.85 |
| Initial conversion ratio for unflattened pile | 0.90 |
| Fuel irradiation maximum mwd./ton | 10,000 |
| $Pu^{239}$ (non-military grade) produced per year gm | 103,300 |
| $Pu^{240}$ produced per year gm | 44,900 |
| $Pu^{241}$ (non-military grade) produced per year gm | 13,700 |
| Total thermally fissionable Pu produced per year gm | 117,000 |

Reference is made to the copending Okrent et al. application Serial No. 441,695, filed July 6, 1954, and more particularly to the reactor of FIGS. 16–25 thereof and the description relating to this reactor for a more complete understanding of the use to which the fuel-element assembly 252 of the present application is put.

As shown in FIG. 10, a fuel element or ribbon 370 which is of oblong rectangular section has a zirconium coating 284 and a core 286 of uranium of the same composition as the core 286 of the ribbon 268. The ribbons 370 are twisted throughout their lengths and are adapted to be assembled in bundles as shown for the ribbons 268 in Figs. 5 to 8 and 13.

Figure 14:
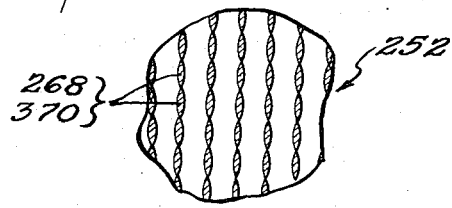
FIGS. 14 and 15 are horizontal sectional views at different levels of a modified assembly of the present invention which differs in the packing of the fuel elements.
Figure 15:
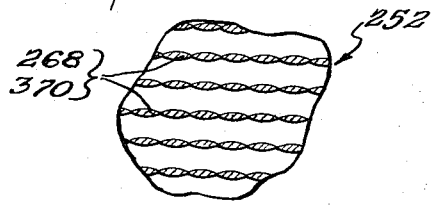

Figs. 14 and 15 illustrate a modified arrangement of ribbons 268 or 370 in which the contacting ribbons of one row are not staggered with respect to the ribbons of the adjacent rows on both sides but each ribbon of one row is coextensive with a ribbon of each of the adjacent rows. Thus, as shown in FIG. 14, there are parallel rows of contacting ribbons at one level of the assembly 252 extending in one direction, and as shown in FIG 15, there are new parallel rows of contacting ribbons at another higher level of the assembly 252 extending in another direction at right angles to the said one direction on FIG. 14. Thus, with this arrangement of fuel ribbons or elements there is edge-to-edge contact in rows at every 90 degrees of twist of the ribbons.

The arrangement of FIGS. 5 to 8 and that of FIGS. 14 and 15 are alike in having edge-to-edge ribbon contact in rows extending in different directions at various levels of the fuel-element assemblies. The arrangements are further alike in involving the positioning of the ribbon axes at the corners of equilateral parallelograms. In the arrangement of FIGS. 14 and 15 this equilateral parallelogram is a square. In the arrangement of FIGS. 5 to 8 the equilateral parallelogram has 60° and 120° angles, and except at the peripheral region of the fuel-element assembly, the axis of a given ribbon or element passes through the center of a regular hexagon through the corners of which pass the axes of the six ribbons or elements surrounding the given ribbon. It follows that in the arrangement of FIGS. 5 to 8 the axes of any three ribbons each of which is adjacent to the other two pass through the corners of an equilateral triangle.

The intention is to limit the invention only within the scope of the appended claims.

What is claimed is:

1. A fuel-element assembly comprising a plurality of fuel-element ribbons, each comprising a core containing material fissionable by neutrons of thermal energy and a protective coating surrounding the core, the ribbons being twisted throughout their lengths and arranged in parallel side-by-side relationship with the axes of the ribbons located at the corners of imaginary equilateral parallelograms, the edges of the ribbons at a first plane transverse to their lengths contacting one another so as to cause the ribbons to be aligned edgewise in a first set of parallel rows, said edges at a second plane parallel to and spaced from the first plane contacting one another so as to cause the ribbons to be aligned edgewise in a second set of parallel rows rotated a certain amount from the first set of rows, the edges of the ribbons contacting one another at a third plane parallel to and spaced from the second plane and on the side thereof opposite the first plane so as to cause the ribbons to be aligned edgewise in a third set of parallel rows rotated twice said certain amount from the first set of rows and in the same direction as the second set of rows.

2. A fuel-element assembly comprising a plurality of fuel-element ribbons, each comprising a core containing material fissionable by neutrons of thermal energy and a protective coating surrounding the core, the ribbons being twisted throughout their lengths and arranged in parallel side-by-side relationship with the axes of the ribbons located at the corners of imaginary equilateral triangles so as to cause each ribbon away from the peripheral region of the assembly to be immediately surrounded by six ribbons and the axis of said each ribbon to be at the center of an imaginary regular hexagon having corners at which the axes of said six ribbons are located, the edges of the ribbons at a first plane transverse to their lengths contacting one another so as to cause the ribbons to be aligned edgewise in a first set of spaced parallel rows, said edges at a second plane parallel to and spaced from the first plane contacting one another so as to cause the ribbons to be aligned edgewise in a second set of spaced parallel rows rotated 60 degrees from the first set of rows, the edges of all the ribbons contacting one another at a third plane parallel to and spaced from the first and second planes on the side of the second plane opposite the first plane, said edges at the third plane contacting so as to cause the ribbons to be aligned edgewise in a third set of spaced parallel rows rotated 120 degrees from the first set of rows in the same direction as the second set of rows.

3. A fuel-element assembly comprising a plurality of fuel-element ribbons, each comprising a core containing material fissionable by neutrons of thermal energy and a protective coating surrounding the core, the ribbons being twisted throughout their lengths and arranged in parallel side-by-side relationship with the axes of the ribbons located at the corners of imaginary equilateral parallelograms, the edges of all the ribbons at a first plane transverse to their lengths contacting one another so as to cause the ribbons to be aligned edgewise in a first set of parallel rows, said edges at a second plane parallel to and spaced from the first plane contacting one another so as to cause the ribbons to be aligned edgewise in a second set of parallel rows rotated 60 degrees from the first set of rows, the edges of the ribbons contacting one another at a third plane parallel to and spaced from the second plane and on the side thereof opposite the first plane so as to cause the ribbons to be aligned edgewise in a third set of parallel rows rotated 120 degrees from the first set of rows and in the same direction as the second set of rows.

4. A fuel-element assembly comprising a plurality of fuel-element ribbons, each comprising a core containing material fissionable by neutrons of thermal energy and a protective coating surrounding the core, the ribbons being twisted throughout their lengths and arranged in parallel side-by-side relationship with the axes of the ribbons located at the corners of imaginary squares so as to cause each ribbon away from the peripheral region of the assembly to be immediately surrounded by four ribbons and the axis of said each ribbon to be at the center of another imaginary square having corners at which the axes of said four ribbons are located, the edges of all the ribbons at a first plane transverse to their lengths contacting one another so as to cause the ribbons to be aligned edgewise in a first set of parallel rows, said edges at a second plane parallel to and spaced from the first plane contacting one another so as to cause the ribbons to be aligned edgewise in a second set of parallel rows rotated 90 degrees from the first set of rows, the edges of the ribbons contacting one another at a third plane parallel to and spaced from the second plane on the opposite side of the second plane from the first plane so as to cause the ribbons to be aligned edgewise in a third set of parallel rows rotated 180 degrees from the first set of rows.

References Cited in the file of this patent

UNITED STATES PATENTS

| | | |
|---|---|---|
| 2,068,955 | Kritzer et al. | Jan. 26, 1937 |
| 2,070,427 | Faunce | Feb. 9, 1937 |
| 2,708,656 | Fermi et al. | May 17, 1955 |

FOREIGN PATENTS

| | | |
|---|---|---|
| 13,492 | Great Britain | A.D. 1905 |

OTHER REFERENCES

Materials Testing Reactor Project Handbook, U.S. A.E.C. TID–7001, dated May 7, 1951, declassified Aug. 24, 1955, page 50. Available @ $2.45, O.T.S., Dept. of Commerce, Washington 25, D.C.

Breazeale: U.S.A.E.C. Document AECD–3435, dated Apr. 15, 1952, declassified Aug. 13, 1952, 59 pages. Pages 9–15 relied upon. Available @ 45¢, O.T.S.